United States Patent
Akiyama et al.

(10) Patent No.: US 10,323,133 B2
(45) Date of Patent: Jun. 18, 2019

(54) MOLDING MATERIAL, SHEET MOLDING COMPOUND, AND FIBER-REINFORCED COMPOSITE MATERIAL OBTAINED USING SAME

(71) Applicant: Mitsubishi Rayon Co., Ltd., Chiyoda-ku (JP)

(72) Inventors: Koichi Akiyama, Tokyo (JP); Yuji Kazehaya, Tokyo (JP); Mitsushi Nishimura, Tokyo (JP); Shinichiro Furuya, Tokyo (JP)

(73) Assignee: MITSUBISHI CHEMICAL CORPORATION, Chiyoda-ku (JP)

( * ) Notice: Subject to any disclaimer, the term of this patent is extended or adjusted under 35 U.S.C. 154(b) by 0 days.

(21) Appl. No.: 15/509,027

(22) PCT Filed: Sep. 8, 2015

(86) PCT No.: PCT/JP2015/075440
§ 371 (c)(1),
(2) Date: Mar. 6, 2017

(87) PCT Pub. No.: WO2016/039326
PCT Pub. Date: Mar. 17, 2016

(65) Prior Publication Data
US 2017/0298199 A1    Oct. 19, 2017

(30) Foreign Application Priority Data
Sep. 12, 2014 (JP) .................. 2014-186195

(51) Int. Cl.
| | | |
|---|---|---|
| *C08J 5/24* | (2006.01) | |
| *C08J 5/04* | (2006.01) | |
| *B29C 70/50* | (2006.01) | |
| B29C 70/46 | (2006.01) | |
| B29K 33/00 | (2006.01) | |
| B29K 105/08 | (2006.01) | |
| B29K 307/04 | (2006.01) | |

(52) U.S. Cl.
CPC .............. *C08J 5/24* (2013.01); *B29C 70/504* (2013.01); *C08J 5/042* (2013.01); B29C 70/465 (2013.01); B29K 2033/08 (2013.01); B29K 2105/0872 (2013.01); B29K 2307/04 (2013.01); C08J 2363/10 (2013.01); C08J 2367/06 (2013.01); C08J 2375/14 (2013.01)

(58) Field of Classification Search
CPC ..... C08J 5/24; C08J 2375/14; B29K 2307/04; B29K 2033/08
See application file for complete search history.

(56) References Cited

U.S. PATENT DOCUMENTS

| | | | |
|---|---|---|---|
| 4,622,254 A | * | 11/1986 | Nishimura ............ B29C 70/228 428/102 |
| 6,592,986 B1 | | 7/2003 | Hakotani et al. |
| 2007/0042190 A1 | | 2/2007 | Yamada et al. |
| 2015/0274911 A1 | * | 10/2015 | Suzuki .................... B32B 27/38 428/414 |

FOREIGN PATENT DOCUMENTS

| | | |
|---|---|---|
| JP | 59-220140 A | 12/1984 |
| JP | 8-301998 A | 11/1996 |
| JP | 2001-348440 A | 12/2001 |
| JP | 2005-114140 A | 4/2005 |
| JP | 2013-203773 A | 10/2013 |
| JP | 2014-19707 A | 2/2014 |

OTHER PUBLICATIONS

Supplementary Search Report dated Aug. 17, 2017 in European Patent Application No. 15840824.5.
International Search Report dated Nov. 24, 2015 in PCT/JP2015/075440 filed Sep. 8, 2015.

* cited by examiner

*Primary Examiner* — Hannah J Pak
(74) *Attorney, Agent, or Firm* — Oblon, McClelland, Maier & Neustadt, L.L.P.

(57) ABSTRACT

The present invention relates to a molding material, having: (A): a fiber substrate made of carbon fibers 5 mm or longer; (B): at least either an epoxy (meth)acrylate resin or an unsaturated polyester resin; (C): (C-1) inorganic fibrous filler with a cross-sectional area of at least 0.8 $\mu m^2$, or (C-2) inorganic flaky filler with a cross-sectional area of at least 0.05 $\mu m^2$, both of which have an aspect ratio of 2.0 or higher and a length of less than 3 mm; and (D): a polyisocyanate compound.

11 Claims, 2 Drawing Sheets

MOLDING MATERIAL, SHEET MOLDING COMPOUND, AND FIBER-REINFORCED COMPOSITE MATERIAL OBTAINED USING SAME

TECHNICAL FIELD

The present invention relates to a molding material, especially a sheet molding compound, and to a fiber-reinforced composite material obtained by using the same.

The present application is based upon and claims the benefit of priority to Japanese Application No. 2014-186195, filed Sep. 12, 2014, the entire contents of which are incorporated herein by reference.

BACKGROUND ART

Sheet molding compounds (hereinafter referred to as SMCs) are formed using short reinforcing fibers. Thus, when composite materials are formed by using SMCs, the mechanical properties are lower than those of a prepreg formed by using continuous fibers as reinforcing fibers. Despite such a problem, since SMCs flow when filled into a die during a molding process, SMCs are preferable for making complex shapes with detailed contours, which are hard to follow when using a prepreg formed with continuous fibers.

Among reinforcing fibers, since carbon fibers have the highest specific strength and specific modulus of elasticity, and are capable of forming significantly lightweight molded articles (fiber-reinforced composite material), carbon fibers are used in various applications. While reinforcing fibers in SMCs are being replaced from glass fibers to carbon fibers (Patent Literature 1), technological developments are under way to enhance the appearance of molded articles of carbon-fiber SMCs, and to cap an increase in cost caused by using carbon fibers (achieving lower cost).

One of the measures for achieving lower cost is to prepare SMCs by using fiber bundles composed of 10000 or more single fibers. However, molded articles formed using such SMCs may face problems such as insufficient strength and insufficient elastic modulus even when enough carbon fibers are contained therein. Patent Literature 2 discloses a solution by using carbon fibers having a greater single fiber fineness with preferably a specific roundness.

In addition, it is another option to use both carbon fibers and glass fibers as reinforcing material to be contained in SMCs. However, when glass fibers are also contained, the mechanical properties of the obtained molded articles may be lower than those containing only carbon fibers. To solve such a problem, Patent Literature 3 discloses blended SMCs formed by appropriately adjusting the length of each fiber, the basis weight, and the volume ratios of glass fibers and carbon fibers so as to set their mechanical properties to be at the same level as those of SMCs containing only carbon fibers.

CITATION LIST

Patent Literature

Patent Literature 1: JP2001-348440A
Patent Literature 2: JP2013-203773A
Patent Literature 3: JP2014-19707A

SUMMARY OF THE INVENTION

Problems to be Solved by the Invention

However, it is difficult to obtain commercially available carbon fibers with a greater single fiber fineness and a specific roundness such as those used in Patent Literature 2.

The objective of the present invention is to provide a method for producing a molding material capable of forming fiber-reinforced composite material having excellent mechanical properties without causing a significant increase in production cost.

The inventors of the present invention have conducted intensive studies and found that mechanical properties of molded articles are remarkably enhanced when inorganic filler with a specific shape is added to a molding material containing polyisocyanate compound. Accordingly, the present invention is completed.

Namely, the present invention has the following aspects.

[1] A molding material containing (A): a fiber substrate made of carbon fibers 5 mm or longer; (B): at least either an epoxy (meth)acrylate resin or an unsaturated polyester resin; inorganic fibrous filler (C-1) with a cross-sectional area of at least 0.8 $\mu m^2$ which has an aspect ratio of 2.0 or higher and a length of less than 3 mm; and (D): a polyisocyanate compound.

[2] The molding material according to [1], the weight-average fiber length of component (C-1) is 210 µm or less, and the content of fibers 350 µm or shorter is 85 mass % or more.

[3] The molding material according to [1] or [2], and the component (C-1) is made of milled carbon fibers.

[4] The molding material according to any of [1] to [3], in which the content of the component (C-1) is 0.2 mass % or more.

[5] The molding material according to any of [1] to [4], in which the component (A) is made of short fibers with a length of 5 to 60 mm.

[6] The molding material according to any of [1] to [5], further containing (E): a polymerization initiator.

[7] The molding material according to [6], containing the component (A) at 30 to 70 mass %, the component (B) at 30 to 70 mass %, the component (C-1) at 0.2 to 20 mass %, the component (D) at 5 to 20 mass %, and the component (E) at 0.1 to 5 mass %.

[8] A sheet molding compound made of the molding material described in any of [1] to [7].

[9] A fiber-reinforced composite material obtained by heat-compression molding the molding material described in any of [1] to [7].

[10] A fiber-reinforced composite material obtained by heat-compression molding the sheet molding compound described in [8].

[11] A method for producing a molding material which contains Component (A)': a short fiber bundle made of carbon fibers with a length of 5 to 60 mm; Component (B): at least either an epoxy (meth)acrylate resin or an unsaturated polyester resin; Component (C-1): an inorganic filler having an aspect ratio of 2.0 or higher and a length of less than 3 mm; and Component (D): a polyisocyanate compound. Such a method includes the following steps: a step for preparing a resin composition by mixing the components (B), (C-1) and (D); a step for forming a resin-composition layer by coating the resin composition on a carrier film using a doctor blade; a step for dispersing component (A)' on a surface of the resin-composition layer; a step for forming a laminate film by layering another carrier film having a coated resin composition layer on the surface of the resin-composition layer with component (A)' dispersed thereon in such a way that their respective resin-composition layers face each other; a step for impregnating the resin composition into component (A)' by compressing the laminate film; and a step for increasing the viscosity of the resin composition by maintaining a substantially isothermal condition for the laminate film after impregnation.

Effects of the Invention

According to the present invention, a molding material is provided, which is capable of forming a fiber-reinforced composite material with excellent mechanical properties. Moreover, using such a molding material, variations in mechanical properties are reduced in the fiber-reinforced composite material.

DETAILED DESCRIPTION OF THE EMBODIMENTS

Figure 1:
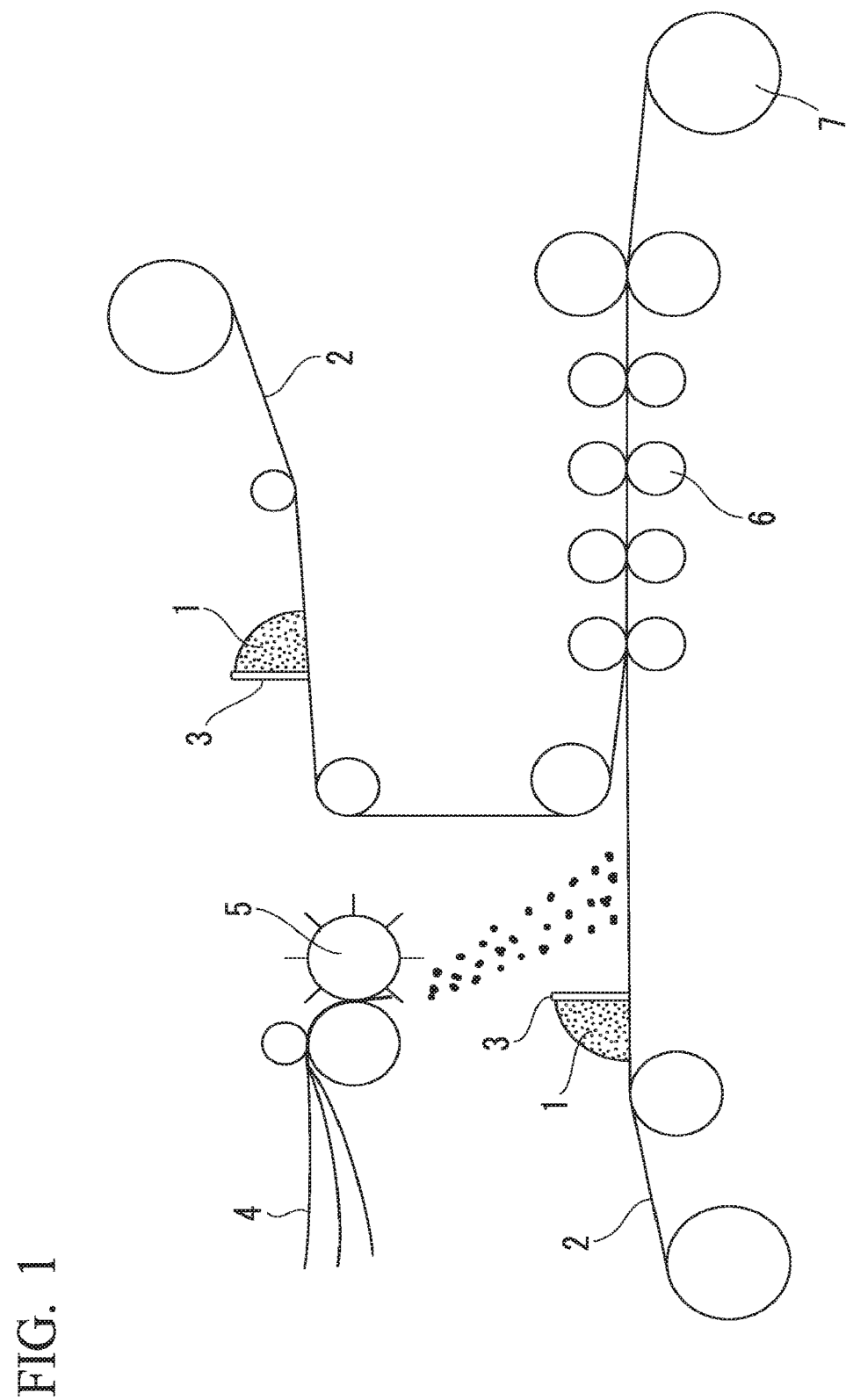
FIG. 1 is a schematic view showing an example of a step for forming an SMC.

The molding material related to the present invention contains (A): a fiber substrate made of carbon fibers 5 mm or longer, (B): at least either an epoxy (meth)acrylate resin or an unsaturated polyester resin, (C): inorganic fibrous filler (C-1) with a cross-sectional area of at least 0.8 $\mu m^2$ or inorganic flaky filler (C-2) with a cross-sectional area of at least 0.05 $\mu m^2$, both of which have an aspect ratio of 2.0 or higher and a length shorter than 3 mm (not containing elements with a length of 3 mm or longer), and (D): a polyisocyanate compound. In the following, each component is described in detail.

(A) Fiber Substrate Made of Carbon Fibers 5 mm or Longer

The molding material related to the present invention contains (A): a fiber substrate made of carbon fibers 5 mm or longer (hereinafter referred to as component (A)).

As for carbon fibers of component (A), polyacrylonitrile (PAN)-based, rayon-based and pitch-based carbon fibers, for example, are used. Among them, PAN-based carbon fibers are preferred because of their excellent compression strength.

The form of component (A) may be short fiber bundles made by cutting carbon fiber bundles (tows) to a specific length, those formed by unidirectionally aligning continuous fibers, woven fabrics formed by using continuous fibers as a warp, those formed by unidirectionally aligning tows and holding the tows with auxiliary weft yarns, multiaxial warp knits formed by laminating multiple unidirectional reinforcing fiber sheets in different directions and holding the sheets with auxiliary yarns, unwoven fabrics, and the like.

Especially, molding materials containing short fiber bundles made by cutting carbon fiber tows to a specific length, namely SMCs, are preferred as component (A). Generally, fiber-reinforced composite materials formed using SMCs tend to have lower mechanical properties than those formed using prepreg or the like. However, their mechanical properties are effectively enhanced according to the present invention.

Also, short fiber bundles formed by cutting carbon fiber tows to a specific length and aforementioned other carbon fiber substrates may be combined and used as component (A). By combining different carbon fiber forms, a molding material is obtained to have advantages derived from both the SMC and the prepreg. Accordingly, when a large scale molded article with detailed contours is produced, the mechanical properties of the entire molded article are thereby improved.

The length of carbon fibers of component (A) is at least 5 mm, preferably at least 10 mm.

When short carbon fiber bundles cut to a specific length are used as component (A), the fibers are preferred to have a length of 5 to 60 mm. By setting a length to be 5 mm or longer, higher mechanical properties are achieved in the fiber-reinforced composite material formed by using such a molding material. Setting the length to be 60 mm or shorter is preferred since excellent flow is exhibited when the molding material is compression molded. It is preferred to set a length generally used when forming SMCs, more preferably 25 mm or shorter.

When short carbon fiber bundles cut to a specific length are used as component (A), it is preferred for the short fiber bundles to be randomly dispersed and two-dimensionally deposited to have a basis weight of 50 to 4000 mg/m, more preferably 1000 to 4000 mg/m. The basis weight of a short fiber bundle is determined by employing the entire basis weight of the carbon fiber tow used as raw material or by employing the divided basis weight thereof. To obtain a homogeneously formed molded article with higher mechanical properties, a basis weight of 50 to 4000 mg/m is preferred. Especially, using short fiber bundles with a basis weight of 1000 mg/m or greater is preferred since a higher elastic modulus is achieved in the fiber-reinforced composite material obtained by curing the molding material related to the present invention.

The content of component (A) in the molding material related to the present invention is preferred to be 30 to 70 mass %, more preferably 40 to 60 mass %. A content of 30 mass % or more is preferred since the mechanical properties of fiber-reinforced composite material are remarkably enhanced, while a content of 70 mass % or less is preferred since excellent flow is exhibited when the molding material is compression-molded.

(B) Epoxy (meth)acrylate Resin and Unsaturated Polyester Resin

The molding material related to the present invention contains at least either an epoxy (meth)acrylate resin or an unsaturated polyester resin (hereinafter referred to as component (B)).

The content of component (B) in the molding material related to the present invention is preferred to be 30 to 70 mass %, more preferably 40 to 60 mass %. A content of 30 mass % or more is preferred since the flowability of the molding material is sufficient to achieve excellent moldability, while a content of 70 mass % or less is preferred since higher mechanical properties are achieved in the resultant fiber-reinforced composite material.

(B-1) Epoxy (meth)acrylate Resin

Epoxy (meth)acrylate resins are unsaturated epoxy esters obtained by reacting an epoxy resin component and an unsaturated monobasic acid component. Examples of an epoxy resin component are compounds having at least two epoxy groups in the molecule, for example, diglycidyl ether epoxy resins with a main skeletal structure of a bisphenol compound represented by bisphenol A, bisphenol F and brominated bisphenol A; polyglycidyl ether epoxy resins with a main skeletal structure of a polynuclear phenol compound represented by phenol or cresol novolac, brominated phenol novolac; polyglycidyl ester epoxy resins with a main skeletal structure of an organic polybasic acid represented by dimer acids and trimellitic acid; glycidyl ether epoxy resins with a main skeletal structure of a diol compound such as ethylene oxide adducts or propylene oxide adducts of bisphenol A, glycol and hydrogenated bisphenol A; and the like. Those epoxy resins may be used alone or in combination thereof as the epoxy resin component.

Examples of an unsaturated monobasic acid component are monobasic acids having a polymerizable unsaturated group such as acrylic acid, methacrylic acid, crotonic acid and sorbic acid. Those monobasic acids having a polymerizable unsaturated group may be used alone or in combination thereof as an unsaturated monobasic acid component.

Regarding epoxy (meth)acrylate resins, any specific type may be used alone or multiple types may be combined for use.

Epoxy (meth)acrylate resins are generally used by adding a polymerizable vinyl monomer such as styrene as a reactive diluent.

Examples of commercially available epoxy (meth)acrylate resins are "Epoxy Ester 3002M," "Epoxy Ester 3000M" and the like (products made by Kyoeisha Chemical Co., Ltd.). Examples of commercially available products with added styrene are "Neopol 8051," "Neopol 8101" and the like (products made by U-Pika Company Ltd.)

(B-2) Unsaturated Polyester Resin

Unsaturated polyester resins are synthesized by condensation of α,β-olefin unsaturated dicarboxylic acids and bivalent glycols. For synthesizing polyester resins, along with those two components, it is an option to use dicyclopentadiene or the like that is reactable with saturated dicarboxylic acids, aromatic dicarboxylic acids or dicarboxylic acids.

Examples of α,β-olefin unsaturated dicarboxylic acids are maleic acid, fumaric acid, itaconic acid, citraconic acid and their anhydrides. Examples of dicarboxylic acids to be combined with those α,β-olefin-based dicarboxylic acids are adipic acid, sebacic acid, succinic acid, gluconic acid, phthalic anhydride, o-phthalic acid, isophthalic acid, terephthalic acid, tetrahydrophthalic acid, tetrachlorophthalic acid, and the like.

Examples of bivalent glycols are alkanediols, oxa-alkane diols, and diols obtained by adding alkylene oxides such as an ethylene oxide or propylene oxide to bisphenol A. Also, mono-ols or triols may be added along with those listed above.

Examples of alkanediols are ethylene glycol, 1,2-propylene glycol, 1,3-propylene glycol, 1,3-butanediol, 1,4-butanediol, neopentyl glycol, 1,5-pentanediol, 1,6-hexane diol, cyclohexane diol, and the like. Examples of oxa-alkane diols are dioxyethylene glycol, dipropylene glycol, triethylene glycol, and the like. Monovalent or trivalent alcohols to be combined with those glycols are octyl alcohol, oleyl alcohol, trimethylol propane, and the like.

Regarding unsaturated polyester resins, any specific type may be used alone, or multiple types may be combined for use. The same as the aforementioned epoxy (meth)acrylate resins, unsaturated polyester resins are generally used by adding a polymerizable vinyl monomer such as styrene as the reactive diluent.

Epoxy (meth)acrylate resins or unsaturated polyester resins may each be used alone or in combination thereof. When combined, the combination ratio of an epoxy (meth)acrylate resin to an unsaturated polyester resin may be selected appropriately depending on their types; it is usually a mass ratio of 1:4 to 4:1, preferably 1:2 to 2:1.

(C) Inorganic Filler with Aspect Ratio of 2.0 or Higher and Length of Less than 3 mm (Namely, Elements with a Length of 3 mm or Longer are Excluded)

The molding material related to the present invention contains (C): an inorganic filler with an aspect ratio of 2.0 or higher that does not include elements having a length of 3 mm or longer (hereinafter may also be referred to as "component (C)").

Component (C) is either (C-1) or (C-2) below.

(C-1): inorganic fibrous filler with a cross-sectional area of at least 0.8 μm$^2$ (C-2): inorganic flaky filler with a cross-sectional area of at least 0.05 μm$^2$ As described later, component (C) enhances mechanical properties of the molding material related to the present invention. (C-1) and (C-2) may be used alone or in combination thereof.

Generally speaking, an SMC containing epoxy (meth)acrylate resin or unsaturated polyester resin is formed when a matrix resin composition is impregnated into a reinforcing fiber substrate and its viscosity is increased by a thickener such as magnesium oxide, polyisocyanate compounds or the like. According to the study by the inventors, it was found that when component (C) related to the present invention was mixed into a molding material with a viscosity increased by magnesium oxide, hardly any improvement was observed in the mechanical properties of the resultant fiber-reinforced composite material, whereas when mixed in a molding material with a viscosity increased by a polyisocyanate compound, mechanical properties of the fiber-reinforced composite material were significantly enhanced.

The reasons are thought to be as follows, for example:

Fiber-reinforced composite material formed by using a molding material with a viscosity increased by magnesium oxide tends to be more fragile than that formed by using a molding material with a viscosity increased by a polyisocyanate compound. Accordingly, before the improvements in mechanical properties derived from component (C) are expressed, the composite material itself may be damaged.

When an inorganic filler made of carbon fibers, for example, is used as component (C), since a polyisocyanate compound is reactive with a polar group existing on the carbon fiber surfaces, a matrix resin composition containing a polyisocyanate compound is highly adhesive with component (C).

When an inorganic filler made of carbon fibers, for example, is used as component (C), urethane bonds formed by reactions of a polyisocyanate compound and the hydroxyl group of component (B) have excellent adhesiveness with carbon fibers. Accordingly, a matrix resin composition containing a polyisocyanate compound is highly adhesive with component (C).

As a result, a molding material containing later-described component (D): polyisocyanate compound effectively contributes to improving mechanical properties such as strength, elastic modulus and the like of the fiber-reinforced composite material.

In addition, adding component (C) reduces variations in mechanical properties of fiber-reinforced composite material produced using a molding material that contains component (C), and high quality molded articles are thereby consistently produced.

The aspect ratio of component (C) is usually 2.0 or higher, preferably 3.0 or higher, more preferably 4.0 or higher, considering the effect on enhancing the elastic modulus of fiber-reinforcing composite materials. Moreover, component (C) is prepared not to include elements of 3 mm or longer, and it is more preferable not to include elements of 1 mm or longer in view of processability during the production of a molding material.

The content of component (C) in the molding material related to the present invention is preferred to be 0.2 to 20 mass %, more preferably 0.2 to 10 mass %, especially preferably 0.4 to 8 mass %, most preferably 0.4 to 6 mass %. A content of 20 mass % or less in the molding material contributes to excellent impregnation of other components into component (A), and achieves excellent molding results derived from sufficient flowability of the molding material. Also, a content of 0.2 mass % or more contributes to the above-described enhancement of mechanical properties in fiber-reinforced composite material and a reduction in the variations of mechanical properties.

(C-1): Inorganic Fibrous Filler with Cross-Sectional Area of at Least 0.8 $\mu m^2$ For component (C) related to the present invention, (C-1): inorganic fibrous filler with a cross-sectional area of at least 0.8 $\mu m^2$ may be used (hereinafter may also be referred to as "component (C-1)").

In fiber-reinforced composite material, the value of stress generated by tensile or compression force is obtained by dividing the load exerted on an inorganic fibrous filler by the cross-sectional area of the inorganic fibrous filler. Therefore, to enhance strength and elastic modulus by enlarging the cross-sectional area, it is preferred for component (C-1) to have a cross-sectional area of at least 0.8 $\mu m^2$, more preferably 20 $\mu m^2$ or greater.

Furthermore, considering processability when the molding material is manufactured, the cross-sectional area is preferred to be 190000 $\mu m^2$ or less, more preferably 320 $\mu m^2$ or less, especially preferably 260 $\mu m^2$ or less.

The cross-sectional area of an inorganic fibrous filler is calculated as $\pi R^2$ from the radius "R" of the fiber.

The raw material for component (C-1) is not limited specifically as long as it is normally used as an inorganic filler. For example, glass fibers, carbon fibers, aluminum fibers, potassium titanate fibers or the like that are finely homogenized according to usage purposes; silicon nitride whiskers, alumina whiskers, silicon carbide whiskers, nickel whiskers or the like in the shape of needle-like crystals; and so on.

Among them, carbon fibers are especially preferred, more specifically milled carbon fibers, from the viewpoint of adhesiveness with the aforementioned polyisocyanate resins and urethane bond moieties. Any PAN-based or pitch-based carbon fibers may be used.

Component (C-1) is especially preferred when a weight-average fiber length is 210 $\mu m$ or less and the content of fibers 350 $\mu m$ or shorter is 85 mass % or more. By setting the weight-average fiber length at 210 $\mu m$ or less and the content of fibers 350 $\mu m$ or shorter at 85 mass % or more, it is easier to homogeneously disperse the component (C-1) in the molding material. Also, such component (C-1) is significantly effective in enhancing mechanical properties of the obtained fiber-reinforced composite material and in reducing variations in physical properties. Moreover, as described later in the production of a molding material, the component (C-1) is also industrially preferable since it is highly applicable to a production process carried out by using a conventional apparatus such as a doctor blade.

It is especially preferred for component (C-1) to set a weight-average fiber length at 100 $\mu m$ or shorter and a content of fibers 350 $\mu m$ or shorter at 95 mass % or more.

(C-2): Inorganic Flaky Filler with Cross-Sectional Area of at Least 0.05 $\mu m^2$ For component (C) related to the present invention, (C-2): inorganic flaky filler with a cross-sectional area of at least 0.05 $\mu m^2$ may be used (hereinafter may also be referred to as "component (C-2)").

In fiber-reinforced composite material, the value of stress generated by tensile or compression force is obtained when the load exerted on inorganic flaky filler is divided by the cross-sectional area of the inorganic flaky filler. Therefore, to enhance strength and elastic modulus by enlarging the cross-sectional area, the cross-sectional area is preferred to be at least 0.05 $\mu m^2$. Since an inorganic flaky filler is capable of two-dimensionally reinforcing the fiber-reinforced composite material, even those having relatively smaller cross-sectional areas are highly effective. Cross-sectional areas of at least 0.2 $\mu m^2$ are more preferred.

In addition, considering processability of the molding material during production procedures, the cross-sectional area is preferred to be 50000 $\mu m^2$ or less, more preferably 100 $\mu m^2$ or less, especially preferably 1 $\mu m^2$ or less.

The cross-sectional area of inorganic flaky filler is calculated as the product (bh) obtained by multiplying the average particle diameter "b" by thickness "h".

The raw material for component (C-2) is not limited specifically as long as it is normally used as an inorganic filler, for example, talc, mica, clay, glass flakes, calcium sulfate, aluminum hydroxide, boehmite and the like. Among them, boehmite is especially preferable since it is highly effective in enhancing the mechanical properties of fiber-reinforced composite material.

(D) Polyisocyanate Compound

In the molding material related to the present invention, a polyisocyanate compound (hereinafter may also be referred to as "component D") is used as a thickener.

Examples of polyisocyanate compounds are diisocyanates or multifunctional polyisocyanates such as 2,4-toluene diisocyanate, 2,6-toluene diisocyanate, 4,4'-diphenylmethane diisocyanate, isophorone diisocyanate and hexamethylene diisocyanate; isocyanate prepolymers having a terminal isocyanate group obtained by the reaction of a diisocyanate compound and a polyether polyol or polyester polyol having a hydroxyl group; and the like.

Regarding the content of a polyisocyanate compound, the number of isocyanate groups in the polyisocyanate compound is set to be 0.1 to 1.5, preferably 0.5 to 1.2, relative to one hydroxyl group of an epoxy acrylate contained in (B-1): epoxy (meth)acrylate resin or (B-2): unsaturated polyester resin.

To sufficiently increase the viscosity of component (D) in the molding material, the number of isocyanate groups of a polyisocyanate compound is preferred to be 0.1 or greater. Also, to prevent unwanted isocyanate groups from reacting with water and thus causing foam, and to prevent the foam from remaining in the molded article (namely, fiber-reinforced composite material), the number of isocyanate groups in the polyisocyanate compound is preferred to be 1.5 or fewer.

The content of component (D) in the molding material related to the present invention is usually in an approximate range of 5 to 20 mass %.

(E) Polymerization Initiator

The molding material related to the present invention may also contain, if applicable, a polymerization initiator and a curing promoter generally used for curing epoxy (meth) acrylate resins and unsaturated polyester resins.

Examples of polymerization initiators to be used in the present invention are organic peroxides such as 1,1-di(t-butylperoxy)cyclohexane, t-butylperoxy isopropyl carbonate, t-amyl peroxy isopropyl carbonate, methyl ethyl ketone peroxide, t-butylperoxy benzoate, benzoyl peroxide, dicumyl peroxide and cumene hydroperoxide. Those polymerization initiators may be used alone or in combination thereof.

The amount of polymerization initiator is preferred to be 0.1 to 5 parts by weight, more preferably 0.5 to 3 parts by weight relative to 100 parts by weight of the epoxy (meth) acrylate resin composition.

(F) Other Additives

The molding material related to the present invention may also contain additives such as inorganic fillers other than the aforementioned component (C), internal release agents, stabilizers (polymerization inhibitors), pigments, coloring agents or the like within a range that does not spoil the effects of the present invention.

The type of inorganic filler other than component (C) is not limited specifically, and any known material may be used; for example, calcium carbonate, magnesium carbonate, aluminum hydroxide, magnesium hydroxide, calcium hydroxide, silica, fused silica, barium sulfate, titanium oxide, magnesium oxide, calcium oxide, aluminum oxide, calcium phosphate, talc, mica, clay, glass powder and the like. They may be used alone or in combination thereof.

In view of achieving lightweight molded articles, it is preferred to limit the content of inorganic filler to the smallest value within a desired range.

An internal release agent is not limited to a specific type, and any known material may be used; examples are fatty acid metal salts such as zinc stearate, surfactants such as sodium dialkyl sulfosuccinate, and so forth.

(Method for Producing Molding Material)

The production of a molding material related to the present invention is not limited to any specific method; it is manufactured by preparing a resin composition using the aforementioned components (B), (C) and (D) along with other optional components such as component (E) if applicable, and by impregnating component (A) with the prepared composition, which is then left standing for a certain time so as to increase its viscosity.

Especially, to produce a molding material that contains component (A)': 5 to 60 mm-long short carbon fiber bundles to be used as component (A), the following method is preferred.

To produce a molding material containing component (A)': 5 to 60 mm-long short carbon fiber bundles, component (B): at least either an epoxy (meth)acrylate resin or an unsaturated polyester resin, component (C): inorganic filler with an aspect ratio of 2.0 or higher and a length of less than 3 mm, and component (D): polyisocyanate compound, it is preferred to employ a method which includes the following steps: a step for preparing a resin composition by mixing components (B), (C) and (D); a step for forming a resin-composition layer by coating the resin composition on a carrier film using a doctor blade; a step for dispersing component (A)' on a surface of the resin-composition layer; a step for forming a laminate film by layering another carrier film having a coated resin-composition layer onto the surface of resin-composition layer with component (A)' dispersed thereon; a step for impregnating the resin composition into component (A)' by compressing the laminate film; and a step for increasing the viscosity of the resin composition by maintaining a substantially isothermal condition on the laminate film after impregnation.

The above production method is carried out by using a known apparatus such as an SMC machine shown in FIG. 1, for example. More specifically, component (A)' is dispersed on a surface of the resin-composition layer to form a sheet with short carbon fiber bundles two-dimensionally deposited at random. Then, the resin composition is impregnated into the sheet, which is aged for a few days at a temperature of 10 to 50° C. to increase the viscosity. Accordingly, a molding material is obtained.

When an SMC machine as shown in FIG. 1 is used, the resin composition is preferred to have such a viscosity that enables the composition to be impregnated into component (A)' while dripping is prevented from sides of carrier film 2. In addition, after the resin composition is aged, namely, after its viscosity is increased through a substantially isothermally maintained condition, the viscosity is preferred to be such a level that makes it easier to peel the carrier film.

EXAMPLES

The present invention is described in detail by referring to the examples below. However, the present invention is not limited to those examples. The results of the examples and comparative examples are shown in Tables 1 to 5.

Production of Milled Carbon Fibers

Production Example 1

Five carbon fiber bundles, each composed of 60000 (60K) filaments (product name: TRH50 60M, made by Mitsubishi Rayon Co., Ltd., cross-sectional area of a single fiber: 28.3 $\mu m^2$), were bound and cut into 10 mm lengths, which were then fed into a continuous milling machine with a screen hole diameter of 1 mm (product name: Orient Mill VM-32, made by Seishin Enterprise Co., Ltd.) at a rate of 50 kg/h, and were discharged at an air flow of 30 $m^3$/min. Accordingly, milled carbon fibers (M1) were obtained.

Production Example 2

Milled carbon fibers (M2) were prepared the same as in Production Example 1 except that five carbon fiber bundles were cut into 30 mm lengths and the screen hole diameter was set at 3 mm.

Production Example 3

Milled carbon fibers (M3) were prepared the same as in Production Example 2 except that the supply rate was set to be 25 kg/h.

Measuring Fiber Length Distribution

Approximately 50 mg of the milled carbon fibers was weighed and put into approximately 15 grams of ethanol and stirred so that the fibers were dispersed. Immediately after that, 2 mL of the dispersion was transferred to a dish with an inner diameter of 50 mm, which was left standing until the milled carbon fibers were well settled. Using a stereoscopic microscope (SZX12, made by Olympus Corporation), a 50-fold enlarged image of milled carbon fibers settled in ethanol was taken through transmitted light illumination.

The image was analyzed using an image analysis software (2D image analysis software WinROOF, made by Mitani Corporation) as follows.

Black lines in the image (indicating individual short carbon fibers of the milled carbon fibers) were defined as straight lines, and the lengths (Li) (μm) of all the black lines (i) in the image were determined using a needle separation tool of the image analysis software. However, black lines in contact with the edges of the image were excluded from measurement.

Five portions were picked at random not to overlap each other in the dish, and their images were captured to be analyzed the same as above.

Of all the black lines (i) contained in the images of five portions, after the lengths (Li) were determined and listed, the fiber length cumulative mass distribution was obtained from the list. The weight-average fiber length (Lw) of the milled carbon fibers was calculated by expression (1) below.

[Math 1]

$$L_w = \frac{\sum (L_i)^2}{\sum L_i} \quad (1)$$

Note that the symbol Σ in formula (1) means to obtain the sum of the lengths of all the black lines whose lengths are determined as above.

Figure 2:
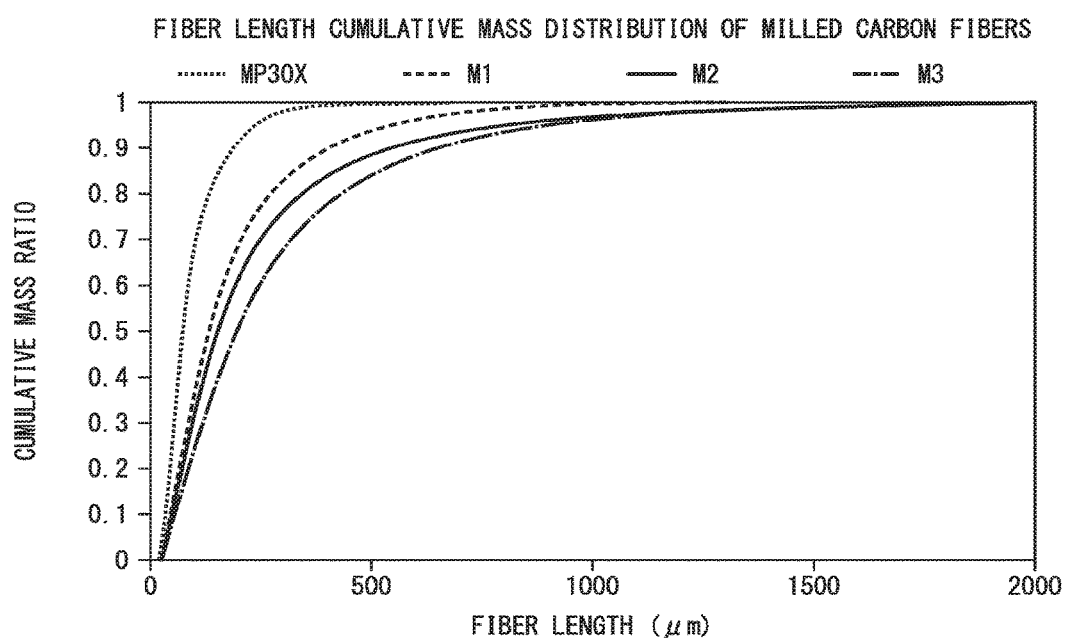
FIG. 2 is a diagram showing cumulative mass distribution curves of milled carbon fibers used in examples and comparative examples.

FIG. 2 is a diagram showing fiber length cumulative mass distribution curves of milled carbon fibers (M1 to M3) prepared in production examples 1 to 3 and of milled carbon fibers (product name: MP30X, made by Nippon Polymer Sangyo Co., Ltd.). The weight-average cumulative fiber length and the content of fibers 350 μm or shorter in each type of milled carbon fibers are shown below. None of the fibers is 3 mm or longer.

Milled carbon fibers (M1): 192 μm, 85 mass %
Milled carbon fibers (M2): 256 μm, 80 mass %
Milled carbon fibers (M3): 301 μm, 73 mass %
Milled carbon fibers (MP30X): 95 μm, 99 mass %

Example 1

Preparing Resin Paste (Resin Composition)

A resin paste was prepared by mixing and stirring well the following: 100 parts by mass of epoxy (meth)acrylate resin (product name: Neopol 8051, made by U-Pika Company Ltd., methacrylic acid adduct of bisphenol A-diglycidyl ether); 0.5 parts by mass of a 75% solution of 1,1-di(t-butylperoxy)cyclohexane (product name: Perhexa C-75 (EB), made by NOF Corporation) and 0.5 parts by mass of a 74% solution of t-butylperoxy isopropyl carbonate (product name: Kayacarbon BIC-75, made by Kayaku Akzo Corporation) as curing agents; 0.35 parts by mass of a phosphate ester-based derivative composition (product name: MoldWiz INT-EQ-6, made by Axel Plastics Research Laboratories Inc.) as the internal release agent; 15.5 parts by mass of modified diphenyl methane diisocyanate (product name: Cosmonate LL, made by Mitsui Chemicals, Inc.) as the thickener; 0.02 parts by mass of 1,4-benzoquinone as a stabilizer, and 5 parts by mass of milled carbon fibers (M1).

Producing SMC

Using a doctor blade, the resin paste was coated on a polyethylene carrier film to have a thickness of 1.0 mm. A carbon fiber bundle with 15000 filaments (TR50S 15 L, made by Mitsubishi Rayon) was chopped into 25 mm lengths and dispersed in random directions on the resin paste coated film to have an approximately uniform basis fiber weight. The coated resin paste with dispersed chopped fibers was sandwiched with another polyethylene carrier film also coated with a 1.0 mm-thick resin paste in such a way that the resin paste was placed on the inner side. The laminated films were passed through rolls to be compressed so that the resin paste was impregnated into the carbon fibers. Accordingly, an SMC precursor was obtained. The SMC precursor was left standing for 72 hours at room temperature (23° C.) to sufficiently increase the viscosity of the resin paste in the SMC precursor. As a result, an SMC was obtained with excellent impregnation of epoxy acrylate resin composition into the carbon fibers. The content of carbon fibers excluding that of milled carbon fibers was 50 mass % of the SMC.

The SMCs were evaluated by the following criteria.

a: resin paste is coated evenly by using a doctor blade to have a uniform thickness on the carrier film.

b: resin paste is not coated to have a uniform thickness on a carrier film because some milled carbon fibers agglomerate in the resin reservoir of the doctor blade and are blocked from passing through the space under the doctor blade.

In addition, after SMC precursors were obtained by impregnating the resin paste into carbon fibers, their impregnation results were evaluated by visual observation and by touch. The evaluation criteria are as follows.

A: resin paste is sufficiently impregnated into carbon fibers.

B: resin paste is not sufficiently impregnated into some of the carbon fibers.

C: resin paste is not impregnated into the carbon fibers.

Preparing CFRP Molded Plate

The SMC was charged into a molding die at a rate (the percentage of the SMC area relative to the die area) of 65%, and was cured for 2 minutes by applying pressure and heat under conditions set to have a die temperature of 140° C. and a pressure of 8 MPa. Accordingly, a 2 mm-thick, 300 mm-square CFRP plate (molded plate) was obtained.

Measuring Mechanical Properties of Molded Plate

A 100 mm×25 mm sample piece was cut out from the molded plate to test its bending strength. Using a 5 kN Instron universal testing machine, a three-point bending test was conducted by setting L/D=40 and crosshead speed of 5 mm/min. The test was conducted on five test pieces and the bending strength and elastic modulus were obtained for each piece. The average values were calculated and set as the bending strength and elastic modulus of the molded plate. Moreover, the coefficient of variation (CV (%)) was determined by dividing the standard deviation by the average value. The molded plate exhibited excellent bending properties such as a bending strength of 375 MPa (CV: 18.4%) and a flexural modulus of 26 GPa (CV: 10.3%).

Example 2

An SMC was prepared the same as in Example 1 except that milled carbon fibers (M1) were replaced with milled carbon fibers (MP30X). When a CFRP molded plate was formed and its mechanical properties were evaluated, the molded plate exhibited excellent bending properties such as a bending strength of 338 MPa (CV: 21%), and a flexural modulus of 26.4 GPa (CV: 17%).

Comparative Example 1

An SMC was obtained the same as in Example 1 except that the resin paste was prepared without using milled carbon fibers. When a CFRP molded plate was formed and its mechanical properties were evaluated, the bending properties were a bending strength of 274 MPa (CV: 26.1%) and a flexural modulus of 19.8 GPa (CV: 21.6%).

Comparative Example 2

An SMC was prepared the same as in Example 1 except that it contained 100 parts by mass of an epoxy acrylate resin to be thickened by MgO (product name: Neopol 8026, made by U-Pika) as the epoxy acrylate resin, 2 parts by mass of zinc stearate (product name: Zinc Stearate, made by NOF) as the internal release agent, and 6 parts by mass of magnesium oxide (product name: KYOWAMAG #150, made by Kyowa Chemical Industry Co., Ltd.) as the thickener. Then, a CFRP molded plate was formed and its mechanical properties were evaluated. As a result, the bending properties were a bending strength of 263 MPa (CV: 10.6%) and a flexural modulus of 22.7 GPa (CV: 12.0%).

Comparative Example 3

An SMC was prepared the same as in Comparative Example 2 except that no milled carbon fiber was used. When a CFRP molded plate was formed and its mechanical properties were evaluated, the bending properties were a bending strength of 272 MPa (CV: 15.9%) and a flexural modulus of 23.8 GPa (CV: 17.8%).

Comparative Example 4

An SMC was prepared the same as in Example 1 except that no milled carbon fiber was used and the content of carbon fibers excluding that of milled carbon fibers was set at 52 mass % (namely, the milled carbon fibers in Example 1 were replaced with the same amount of chopped carbon fibers). When a CFRP molded plate was formed and its mechanical properties were evaluated, the bending properties were a bending strength of 325 MPa (CV: 17.1%) and a flexural modulus of 22.1 GPa (CV: 12.6%).

Table 1 shows the results in Examples 1 and 2, and Comparative Examples 1 to 4.

Example 3

Milled carbon fibers (M4) were prepared by homogeneously mixing milled carbon fibers (MP30X) and milled carbon fibers (M3) at a mass ratio of 50:50 (weight-average fiber length: 198 μm, content of fibers 350 μm or shorter: 86 mass %).

Preparing Resin Paste

A resin paste was prepared the same as in Example 1 except for using milled carbon fibers (M4). Then, an SMC was produced using the resin paste.

Using the SMC, a CFRP molded plate was formed the same as in Example 1, and its mechanical properties were evaluated. The results are shown in Table 2.

Examples 4 to 6

Milled carbon fibers (M8), (M9) and (M10) were respectively prepared by homogeneously mixing milled carbon fibers (MP30X), (M1) and (M2) at the mixing ratios (mass ratios) specified in Table 2.

Resin pastes were respectively prepared the same as in Example 1 except for using milled carbon fibers (M8), (M9) and (M10). Then, SMCs were produced accordingly.

Using their respective SMCs, CFRP molded plates were formed the same as in Example 1, and their mechanical properties were evaluated. The results are shown in Table 2.

TABLE 1

|  |  | Example 1 | Example 2 | Comp. Example 1 | Comp. Example 2 | Comp. Example 3 | Comp. Example 4 |
| --- | --- | --- | --- | --- | --- | --- | --- |
| Milled carbon fibers |  | M1 | MP30X | — | M1 | — | — |
| Weight-average fiber length | μm | 192 | 95 | — | 192 | — | — |
| Content of fibers 350 μm or shorter | mass % | 85.0 | 99.0 | 0.0 | 85.0 | 0.0 | 0 |
| Added amount relative to 100 parts of epoxy acrylate resin (parts by weight) |  | 5 | 5 | 0 | 5 | 0 | 0 |
| Content in SMC (wt. %) |  | 2 | 2 | 0 | 2 | 0 | 0 |
| Epoxy acrylate resin |  | Neopol 8051 | Neopol 8051 | Neopol 8051 | Neopol 8026 | Neopol 8026 | Neopol 8051 |
| Thickening method NCO: isocyanate thickener MgO: magnesium oxide thickener |  | NCO | NCO | NCO | MgO | MgO | NCO |
| Carbon fiber bundle |  | TR50S 15L | TR50S 15L | TR50S 15L | TR50S 15L | TR50S 15L | TR50S 15L |
| Length of chopped carbon fiber bundle | mm | 25 | 25 | 25 | 25 | 25 | 25 |
| Content of carbon fibers | mass % | 50 | 50 | 50 | 50 | 50 | 52 |
| Manufacturing SMC (a: no problem, b: difficult) |  | a | a | a | a | a | a |
| Impregnation result |  | A | A | A | A | A | A |
| Bending strength | MPa | 375 | 338 | 274 | 263 | 272 | 325 |
|  | CV (%) | 18.4 | 21.0 | 26.1 | 10.6 | 15.9 | 17.1 |
| Flexural modulus | GPa | 26.0 | 26.4 | 19.8 | 22.7 | 23.8 | 22.1 |
|  | CV (%) | 10.3 | 17.0 | 21.6 | 12.0 | 17.8 | 12.6 |

TABLE 2

|  |  | Comp. Example 1 | Example 3 | Example 4 | Example 5 | Example 6 |
|---|---|---|---|---|---|---|
| Milled carbon fibers |  | — | M4 | M8 | M9 | M10 |
| Mixing ratio | MP30X | — | 50 | 20 | 60 | 60 |
|  | M1 | — |  | 80 |  | 40 |
|  | M2 | — |  |  | 40 |  |
|  | M3 | — | 50 |  |  |  |
| Weight-average fiber length | μm | — | 198 | 173 | 159 | 134 |
| Content of fibers 350 μm or shorter | mass % | 0.0 | 86.0 | 87.8 | 91.4 | 93.4 |
| Added amount relative to 100 parts of epoxy acrylate resin (parts by weight) |  | 0 | 5 | 5 | 5 | 5 |
| Content in SMC (wt. %) |  | 0 | 2 | 2 | 2 | 2 |
| Epoxy acrylate resin |  | Neopol 8051 | Neopol 8051 | Neopol 8051 | Neopol 8051 | Neopol 8051 |
| Thickening method NCO: isocyanate thickener |  | NCO | NCO | NCO | NCO | NCO |
| Carbon fiber bundle |  | TR50S 15L | TR50S 15L | TR50S 15L | TR50S 15L | TR50S 15L |
| Length of chopped carbon fiber bundle | mm | 25 | 25 | 25 | 25 | 25 |
| Content of carbon fibers | mass % | 50 | 50 | 50 | 50 | 50 |
| Manufacturing SMC (a: no problem, b: difficult) |  | a | a | a | a | a |
| Impregnation result |  | A | A | A | A | A |
| Bending strength | MPa | 274 | 347 | 337 | 333 | 352 |
|  | CV(%) | 26.1 | 13.6 | 13.9 | 13.7 | 11.7 |
| Flexural modulus | GPa | 19.8 | 24.2 | 23.8 | 24.6 | 23.0 |
|  | CV(%) | 21.6 | 16.3 | 12.6 | 13.5 | 8.4 |

Examples 7 to 11

Resin pastes were prepared the same as in Example 1 except that the amounts of milled carbon fibers (M1) were respectively changed as specified in Table 3. Then, SMCs were produced accordingly.

Using the obtained SMCs, CFRP molded plates were molded respectively the same as in Example 1, and their mechanical properties were evaluated. The results are shown in Table 3.

TABLE 3

|  |  | Comp. Example 1 | Example 1 | Example 7 | Example 8 | Example 9 | Example 10 | Example 11 |
|---|---|---|---|---|---|---|---|---|
| Milled carbon fibers |  | — | M1 | M1 | M1 | M1 | M1 | M1 |
| Weight-average fiber length | μm | — | 192 | 192 | 192 | 192 | 192 | 192 |
| Content of fibers 350 μm or shorter | mass % | 0.0 | 85.0 | 85.0 | 85.0 | 85.0 | 85.0 | 85.0 |
| Added amount relative to 100 parts of epoxy acrylate resin (parts by weight) |  | 0 | 5 | 1 | 2.5 | 10 | 15 | 20 |
| Content in SMC (wt. %) |  | 0 | 2 | 0.4 | 1 | 4 | 6 | 8 |
| Epoxy acrylate resin |  | Neopol 8051 | Neopol 8051 | Neopol 8051 | Neopol 8051 | Neopol 8051 | Neopol 8051 | Neopol 8051 |
| Thickening method NCO: isocyanate thickener |  | NCO | NCO | NCO | NCO | NCO | NCO | NCO |
| Carbon fiber bundle |  | TR50S 15L | TR50S 15L | TR50S 15L | TR50S 15L | TR50S 15L | TR50S 15L | TR50S 15L |
| Length of chopped carbon fiber bundle | mm | 25 | 25 | 25 | 25 | 25 | 25 | 25 |
| Content of carbon fibers | mass % | 50 | 50 | 50 | 50 | 50 | 50 | 50 |
| Manufacturing SMC (a: no problem, b: difficult) |  | a | a | a | a | a | a | a |
| Impregnation result |  | A | A | A | A | A | A | B |
| Bending strength | MPa | 274 | 375 | 315 | 348 | 340 | 363 | 316 |
|  | CV(%) | 26.1 | 18.4 | 12.1 | 20.7 | 13.2 | 15.4 | 13.9 |
| Flexural modulus | GPa | 19.8 | 26.0 | 21.4 | 23.9 | 25.6 | 31.7 | 28.6 |
|  | CV(%) | 21.6 | 10.3 | 12.1 | 14.0 | 8.0 | 15.0 | 8.1 |

Example 12

A resin paste was prepared the same as in Example 1 except for mixing 65 parts by mass of epoxy (meth)acrylate resin (product name: Neopol 8051, made by U-Pika, methacrylic acid adduct of bisphenol A diglycidyl ether), and 35 parts by mass of unsaturated polyester resin (product name: U-Pika 7579, made by U-Pika). Then, an SMC was produced accordingly.

Using the obtained SMC, a CFRP molded plate was molded the same as in Example 1 and its mechanical properties were evaluated. The results are shown in Table 4.

Comparative Example 5

An SMC was formed the same as in Example 12 except that a resin paste was prepared without using milled carbon fibers. Then, a CFRP molded plate was formed and its mechanical properties were evaluated. The results are shown in Table 4.

Example 13

A resin paste was prepared the same as in Example 1 except that epoxy (meth)acrylate resin (product name: Neopol 8051, made by U-Pika, methacrylic acid adduct of bisphenol A diglycidyl ether) was replaced with 100 parts by mass of unsaturated polyester resin (product name: U-Pika 7579, made by U-Pika). Then, an SMC was produced accordingly.

Using the obtained SMC, a CFRP molded plate was molded the same as in Example 1 and its mechanical properties were evaluated. The results are shown in Table 4.

Comparative Example 6

An SMC was formed the same as in Example 13 except that a resin paste was prepared without using milled carbon fibers. Then, a CFRP molded plate was formed and its mechanical properties were evaluated. The results are shown in Table 4.

Comparative Example 7

Preparing Resin Paste

A resin paste was prepared the same as in Example 1 except that milled carbon fibers (M1) were replaced with milled carbon fibers (M2).

Producing SMC

Using a doctor blade, the resin paste was coated on a polyethylene carrier film to have a thickness of 1.0 mm. However, since some milled carbon fibers in the resin reservoir of a doctor blade could not pass through the space under the doctor blade, it was difficult to coat the resin paste on the polyethylene carrier film. As a result, the obtained carbon fiber-reinforced SMC did not achieve excellence.

Comparative Example 8

Preparing Resin Paste

A resin paste was prepared the same as in Example 1 except that milled carbon fibers (M1) were replaced with milled carbon fibers (M3).

Producing SMC

Using a doctor blade, the resin paste was coated on a polyethylene earlier film to have a thickness of 1.0 mm. However, some milled carbon fibers in the resin reservoir of a doctor blade could not pass through the space under the doctor blade. As a result, the obtained carbon fiber-reinforced SMC did not achieve excellence.

Comparative Example 9

Milled carbon fibers (M5) were prepared by homogeneously mixing milled carbon fibers (MP30X) and milled carbon fibers (M3) at a mass ratio of 40:60 (weight-average fiber length: 219 μm, content of fibers 350 μm or shorter: 83.4 mass %).

Preparing Resin Paste

A resin paste was prepared the same as in Example 1 except for using the obtained milled carbon fibers (M5).

Producing SMC

Using a doctor blade, the resin paste was coated on a polyethylene carrier film to have a thickness of 1.0 mm. However, some of the milled carbon fibers agglomerated in the resin reservoir of the doctor blade and could not pass through the space under the doctor blade.

Comparative Example 10

Milled carbon fibers (M6) were prepared by homogeneously mixing milled carbon fibers (M1) and milled carbon fibers (M3) at a mass ratio of 90:10 (weight-average fiber length: 203 μm, content of fibers 350 μm or shorter: 83.8 mass %).

Preparing Resin Paste

A resin paste was prepared the same as in Example 1 except for using milled carbon fibers (M6).

TABLE 4

|  |  | Example 1 | Comp. Example 1 | Example 12 | Comp. Example 5 | Example 13 | Comp. Example 6 |
|---|---|---|---|---|---|---|---|
| Milled carbon fibers |  | M1 | — | M1 | — | M1 | — |
| Weight-average fiber length | μm | 192 | — | 192 | — | 12 | — |
| Content of fibers 350 μm or shorter | mass % | 85.0 | 0.0 | 85.0 | 0.0 | 85.0 | 0.0 |
| Added amount relative to 100 parts of resin (parts by weight) |  | 5 | 0 | 5 | 0 | 5 | 0 |
| Content in SMC (wt. %) |  | 2 | 0 | 2 | 0 | 2 | 0 |
| Epoxy acrylate resin: Neopol 8051 |  | 100 | 100 | 65 | 65 | — | — |
| Unsaturated polyester resin: U-Pika 7579 |  | — | — | 35 | 35 | 100 | 100 |
| Thickening method NCO: isocyanate thickener |  | NCO | NCO | NCO | NCO | NCO | NCO |
| Carbon fiber bundle |  | TR50S 15L | TR50S 15L | TR50S 15L | TR50S 15L | TR50S 15L | TR50S 15L |
| Length of chopped carbon fiber bundle | mm | 25 | 25 | 25 | 25 | 25 | 25 |
| Content of carbon fibers | mass % | 50 | 50 | 50 | 50 | 50 | 50 |
| Manufacturing SMC (a: no problem, b: difficult) |  | a | a | a | a | a | a |
| Impregnation result |  | A | A | A | A | A | A |
| Bending strength | MPa | 375 | 274 | 331 | 229 | 228 | 208 |
|  | CV(%) | 18.4 | 26.1 | 13.1 | 24.6 | 10.8 | 16.0 |
| Flexural modulus | GPa | 26.0 | 19.8 | 24.2 | 17.3 | 25.5 | 22.6 |
|  | CV(%) | 10.3 | 21.6 | 8.1 | 16.5 | 6.9 | 15.6 |

Producing SMC

Using a doctor blade, the resin paste was coated on a polyethylene carrier film to have a thickness of 1.0 mm. However, some of the milled carbon fibers agglomerated in the resin reservoir of the doctor blade and could not pass through the space under the doctor blade.

Comparative Example 11

Milled carbon fibers (M7) were prepared by homogeneously mixing milled carbon fibers (MP30X) and milled carbon fibers (M2) at a mass ratio of 27:73 (weight-average fiber length: 213 μm, content of fibers 350 μm or shorter: 85.1 mass %).

Preparing Resin Paste

A resin paste was prepared the same as in Example 1 except for using the obtained milled carbon fibers (M7).

Producing SMC

Using a doctor blade, the resin paste was coated on a polyethylene carrier film to have a thickness of 1.0 mm. However, some of the milled carbon fibers agglomerated in the resin reservoir of the doctor blade and could not pass through the space under the doctor blade.

TABLE 5

|  |  | Example 1 | Comp. Example 7 | Comp. Example 8 | Example 3 | Comp. Example 9 | Comp. Example 10 | Comp. Example 11 |
| --- | --- | --- | --- | --- | --- | --- | --- | --- |
| Milled carbon fibers |  | M1 | M2 | M3 | M4 | M5 | M6 | M7 |
| Mixing ratio | MP30X |  |  |  | 50 | 40 |  | 27 |
|  | M1 | 100 |  |  |  |  | 90 |  |
|  | M2 |  | 100 |  |  |  |  | 73 |
|  | M3 |  |  | 100 | 50 | 60 | 10 |  |
| Weight-average fiber length | μm | 192 | 256 | 301 | 198 | 219 | 203 | 213 |
| Content of fibers 350 μm or shorter | mass % | 85.0 | 80.0 | 73.0 | 86.0 | 83.4 | 83.8 | 85.1 |
| Added amount relative to 100 parts of epoxy acrylate resin (parts by weight) |  | 5 | 5 | 5 | 5 | 5 | 5 | 5 |
| Content in SMC (wt. %) |  | 2 | 2 | 2 | 2 | 2 | 2 | 2 |
| Epoxy acrylate resin |  | Neopol 8051 | Neopol 8051 | Neopol 8051 | Neopol 8051 | Neopol 8051 | Neopol 8051 | Neopol 8051 |
| Thickening method NCO: isocyanate thickener MgO: magnesium oxide thickener |  | NCO | NCO | NCO | NCO | NCO | NCO | NCO |
| Manufacturing SMC (a: no problem, b: difficult) |  | a | b | b | a | b | b | b |

Compared with a molding material formed using magnesium oxide as the thickener or formed without using an inorganic filler with a specific shape, the molding material related to the present invention is capable of consistently producing fiber reinforced composite materials having excellent strength and elastic modulus.

INDUSTRIAL APPLICABILITY

A molding material related to the present invention is capable of forming fiber reinforced composite materials having excellent mechanical properties. Moreover, the variations in physical properties are reduced in the obtained fiber reinforced composite materials when they are produced using the molding material.

DESCRIPTION OF NUMERICAL REFERENCES 1 resin paste
2 carrier film
3 doctor blade
4 carbon fiber bundle
5 chopper
6 impregnation roll
7 winding roll

The invention claimed is:

1. A molding material, comprising:
   (A): a fiber substrate made of carbon fibers having a length of 5 mm or longer;
   (B): at least one of an epoxy (meth)acrylate resin and an unsaturated polyester resin;
   (C-1): an inorganic fibrous filler having a cross-sectional area of 0.8 μm$^2$ to 38.5 μm$^2$, an aspect ratio of 2.0 or higher and a length of less than 3 mm; and
   (D): a polyisocyanate compound.

2. The molding material according to claim 1, wherein the inorganic fibrous filler (C-1) also has a weight-average fiber length of 210 μm or less and includes fibers having a length of 350 μm or shorter in an amount of 85 mass % or more.

3. The molding material according to claim 1, wherein the inorganic fibrous filler (C-1) is made of milled carbon fibers.

4. The molding material according to claim 1, wherein the inorganic fibrous filler (C-1) is included in the molding material in an amount of 0.2 mass % or more.

5. The molding material according to claim 1, wherein the length of the carbon fibers of the fiber substrate (A) is 5 to 60 mm.

6. The molding material according to claim 1, further comprising:
   (E): a polymerization initiator.

7. The molding material according to claim 6, wherein the molding material comprises 30 to 70 mass % of the fiber substrate (A), 30 to 70 mass % of the at least one of the epoxy (meth)acrylate resin and the unsaturated polyester resin (B), 0.2 to 20 mass % of the inorganic fibrous filler (C-1), 5 to 20 mass % of the polyisocyanate compound (D), and 0.1 to 5 mass % of the polymerization initiator (E).

8. A sheet molding compound, comprising:
   the molding material according to claim 1.

9. A fiber-reinforced composite material, obtained by heat-compression molding the molding material according to claim 1.

10. A fiber-reinforced composite material, obtained by heat-compression molding the sheet molding compound according to claim 8.

11. The molding material according to claim 1, wherein the inorganic fibrous filler (C-1) does not include a fiber having a length of 3 mm or longer.

* * * * *